(12) United States Patent
Zimmermann

(10) Patent No.: US 9,110,308 B2
(45) Date of Patent: Aug. 18, 2015

(54) SELF-LEVELING FIVE-BEAM LASER DEVICE

(75) Inventor: Thomas Zimmermann, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 604 days.

(21) Appl. No.: 13/260,404

(22) PCT Filed: Jan. 29, 2010

(86) PCT No.: PCT/EP2010/051044
§ 371 (c)(1),
(2), (4) Date: Apr. 4, 2012

(87) PCT Pub. No.: WO2010/108713
PCT Pub. Date: Sep. 30, 2010

(65) Prior Publication Data
US 2012/0182621 A1    Jul. 19, 2012

(30) Foreign Application Priority Data
Mar. 26, 2009 (DE) .......................... 10 2009 001 891

(51) Int. Cl.
*G02B 27/10* (2006.01)
*G02B 27/64* (2006.01)
*G01C 15/00* (2006.01)

(52) U.S. Cl.
CPC ............ *G02B 27/648* (2013.01); *G01C 15/004* (2013.01)

(58) Field of Classification Search
USPC .................................................. 359/618, 629
See application file for complete search history.

(56) References Cited

U.S. PATENT DOCUMENTS

| | | |
|---|---|---|
| 5,144,487 A | 9/1992 | Hersey |
| 5,617,202 A | 4/1997 | Rando |
| 6,542,304 B2 | 4/2003 | Tacklind et al. |
| 7,328,516 B2 | 2/2008 | Nash et al. |
| 2007/0028469 A1 | 2/2007 | Nash et al. |

FOREIGN PATENT DOCUMENTS

| | | |
|---|---|---|
| CA | 2 251 515 | 5/2000 |
| CN | 1926462 A | 3/2007 |
| DE | 696 21 792 T2 | 1/2003 |
| WO | 00/70375 | 11/2000 |
| WO | 2005/103796 | 11/2005 |

OTHER PUBLICATIONS

International Search Report corresponding to PCT Application No. PCT/EP2010/051044, mailed May 3, 2010 (German and English language document) (7 pages).

*Primary Examiner* — Jack Dinh
(74) *Attorney, Agent, or Firm* — Maginot, Moore & Beck LLP

(57) ABSTRACT

A five-beam laser device that is designed in a self-leveling way and includes three laser sources, wherein two laser beams created by the laser sources are each divided into two partial beams, wherein one of the partial beams in each case meets with the beam of the third laser source at a point P.

14 Claims, 5 Drawing Sheets ary. This simplifies the
SELF-LEVELING FIVE-BEAM LASER DEVICE

This application is a 35 U.S.C. §371 National Stage Application of PCT/EP2010/051044, filed Jan. 29, 2010, which claims the benefit of priority to Application Serial No. DE 10 2009 001 891.3, filed Mar. 26, 2009 in Germany, the disclosures of which are incorporated herein by reference in their entirety.

BACKGROUND

The disclosure relates to a self-leveling five-beam laser device. Such devices are used in industry, trade and the DIY sector for adjustment, marking, measurement and alignment tasks. Owing to the beams, measurement points are projected onto walls and/or objects and thus define a horizontal plane and vertical planes. Such five-point or five-beam laser devices are already known and commercially available.

U.S. Pat. No. 6,542,304 discloses a beam splitter for a laser marking device having a central passage around which four reflective partial surfaces are located, the partial surfaces being inclined by 45° with respect to a laser beam and being arranged in the beam axis such that they are rotationally offset by in each case 90° with respect to one another. Hereby, the beam from a single laser source can be split into five laser partial beams which define a three-dimensional orthogonal system. U.S. Pat. No. 5,617,202 discloses the possibility of beam splitting using mirrors or partially transmitting mirrors.

One of the disadvantages of the prior art is the complex optical construction. In addition, the beams cannot be switched on and off separately. Furthermore, the beam splitting reduces the beam intensity, with the result that the individual projected points are correspondingly less bright, which is a disadvantage since, because of the laser classes, said reduction in intensity cannot readily be compensated for by a more powerful laser.

SUMMARY

It is the object of the present disclosure to remove the disadvantages of the prior art and in particular to make available a self-leveling five-beam laser device which, with compact construction and low production and adjustment costs, generates laser beams with high positional accuracy.

This object is achieved by the five-beam device in claim 1. Preferred exemplary embodiments are stated in the dependent claims.

Provided according to the disclosure is a self-leveling five-beam laser device, which has three laser sources, wherein two of the laser beams generated by the laser sources are split into two partial beams each. In each case one of the partial beams intersects the axis of the beam of the third laser source in a point.

The term five-beam laser device (in the following text also "laser device" for short) means that this device emits five laser beams, corresponding to five axes of a three-dimensional Cartesian (or orthogonal) coordinate system. The coordinate system is preferably aligned such that three of the beams travel from the origin of the coordinate system (that is to say said intersection point) in three of the four main directions of the horizontal and two beams lie in the vertical, that is to say are directed upward or downward. As a result, the device can be used to project five points for example in a room onto the walls, the floor and the ceiling, and the five points can be used for measuring the room or as other reference parameters. The term five-beam means that five beams are generated inside the device and comprises that these beams, on leaving the laser device, can be split in the manner of a fan, for example also using a DOE (as will be described later).

For safety reasons, the output of the lasers in the laser devices is restricted to specific classes, such as laser class 2 or 2M in accordance with DIN EN 60825-1. According to this, a corresponding laser beam is largely harmless for the human eye. However, as large an output as possible is desirable in order to achieve projection points which are as bright as possible. For this reason, splitting the beam from the laser source(s) is a disadvantage, because this also reduces the brightness of each individual projection point. The use of one laser source per beam would thus be advantageous, but this causes problems in relation to cost-effective production and space-saving spatial arrangement of the individual lasers with the corresponding optical elements (such as the collimating lenses, for example). It has thus been established that, when using three laser sources and splitting two of the three laser beams, a five-beam laser device can be produced, which not only has the best possible brightness for each projected laser point, but also has a compact construction.

In the laser device, the laser beams are preferably split into in each case two axis-identical and antiparallel partial beams. This occurs in particular by way of roof mirrors. Roof mirrors are optical elements which can be produced cost-effectively and with high accuracy. The two mirror surfaces thereof, which are arranged at an angle of 90° with respect to each other and aligned at an angle of 45° with respect to the corresponding laser beam, deflect the laser beam accordingly into partial beams with a change in direction of 90°. The two partial beams travel in exactly opposite directions. Alternatively, splitting can also take place by means of a prism. On account of the described deflection, the beams are located on the same axis. As a result, accurate measurement results with reference to the origin of the Cartesian coordinate system which is defined by the laser beams are possible. All the beams are therefore free from angle errors and without offset with respect to the coordinate system.

In one advantageous embodiment, the three laser sources are arranged in an axis-parallel fashion in terms of their longitudinal axes. In particular, the three laser sources emit their beams in the same direction. On account of this arrangement, the three laser sources are situated with their optical elements one next to the other such that they are directly adjacent. This is space-saving. In addition, the electrical connections of the individual laser sources (for example laser diodes) are directly next to one another. This simplifies the electrical wiring. Since the direction of the connection pins of all laser diodes is the same (wherein the angular orientation, however, is rotated in part by 90° due to the elliptical beam widening), it is possible, for example to contact the terminals of the laser diodes directly on a single printed circuit board.

Another advantage of the described embodiment having three lasers is that the laser sources can be switched on and off separately and/or together using electrical switching elements. Since the laser devices are typically powered using a battery, laser sources which are not required can be switched off. Owing to the type of construction, only independent beams can be switched separately, and not the respectively associated partial beams. It is thus possible to switch on and off the frontal beam separately from the horizontal beam pair and also separately from the vertical beam pair.

In an advantageous manner, at least one of the five laser beams or partial beams is passed through a diffractive optical element (DOE, to be explained in more detail below). With this it is possible to project specific shapes such as coordinate crosses, fan-type widening of the beam and the like onto an appropriate projections surface.

Alternatively, at least one of the laser beams or the partial beams can be passed through a square or rectangular diaphragm. On account of this arrangement, the laser beam is masked by simple means such that, owing to diffraction during the projection for example onto a wall, side lobes, which are arranged horizontally and vertically, are produced which form a coordinate cross. The center point of this coordinate cross is brightest and the intensity of the points decreases laterally. This masking is used preferably for the beam from the third laser source, that is to say the laser source where the beam is not split, but is applicable also in each of the other laser (partial) beams.

In a further advantageous embodiment, at least one of the laser beams to be split is passed through a (circular) diaphragm for circular masking. Since the laser sources are preferably laser diodes, a known problem occurs in that the laser diodes generate a beam which has an oval cross section. On account of the use of said masking, a round beam is generated from the oval beam cross section. On account of the masking, only the central region of the beam, that is to say the region of its highest intensity, is transmitted and used. As a result, the projected laser points likewise have an even intensity of equal brightness.

In a further preferred embodiment, the laser sources are configured as laser diodes, and a collimating lens is provided in each case in the beam path. The diaphragm for circular masking is arranged between the laser diode and the collimating lens. In particular, the diaphragm for circular masking is combined with the collimating lens to form an assembly. As a result of this integration, mounting is considerably simplified because only the assembly needs to be inserted into the block of the optical unit and it is automatically centered coaxially with respect to the laser. For adjustment reasons, only the angular position of the roof mirrors, that is to say the deflection direction of the mirrors, needs to be set.

Advantageously, the self-leveling is achieved by way of an internal optical unit, which is mounted against a carrier unit of the five-beam laser device using two mutually perpendicular and preferably horizontally aligned bearing shafts. This bearing is in principle a universal joint, which can also be referred to as a cardan joint. On account of smooth ball bearings, the effect of static friction is reduced such that, even if the laser device is positioned at a slight angle, the internal optical unit can swing to a standstill, with the result that the laser beams automatically align accordingly horizontally or vertically. In the case of the cross bearing, the bearing shafts are preferably offset by 90° with respect to each other. The bearing cross does not have to be configured symmetrically, i.e. with equal spacings between cross center and the bearing points. A function reversal is also possible such that for example in the case of one of the shafts, the universal joint no longer has a bearing shaft but a bearing sleeve, in which a shaft which is mounted on a ball bearing and attached to the optical unit in a rotationally-fixed manner is accommodated. Alternatively, the self-leveling can also be achieved by way of suspended attachment, such as for example using a rope which is as inelastic as possible or using a single-link chain element having twisted chain eyelets or the like.

In a further developed embodiment, the internal optical unit is coupled with respect to the external housing via a vibration damping means for the purpose of damping, and the vibration damping means is configured in particular as an eddy-current brake.

BRIEF DESCRIPTION OF THE DRAWINGS

The disclosure will be explained in detail below with reference to the drawings in an exemplary fashion using exemplary embodiments. The description, the associated figures and the claims contain numerous features in combination. A person skilled in the art will also consider these features, in particular also the features of different exemplary embodiments, by themselves and combine them to form meaningful other combinations.

In the figures.

DETAILED DESCRIPTION

Figure 1:
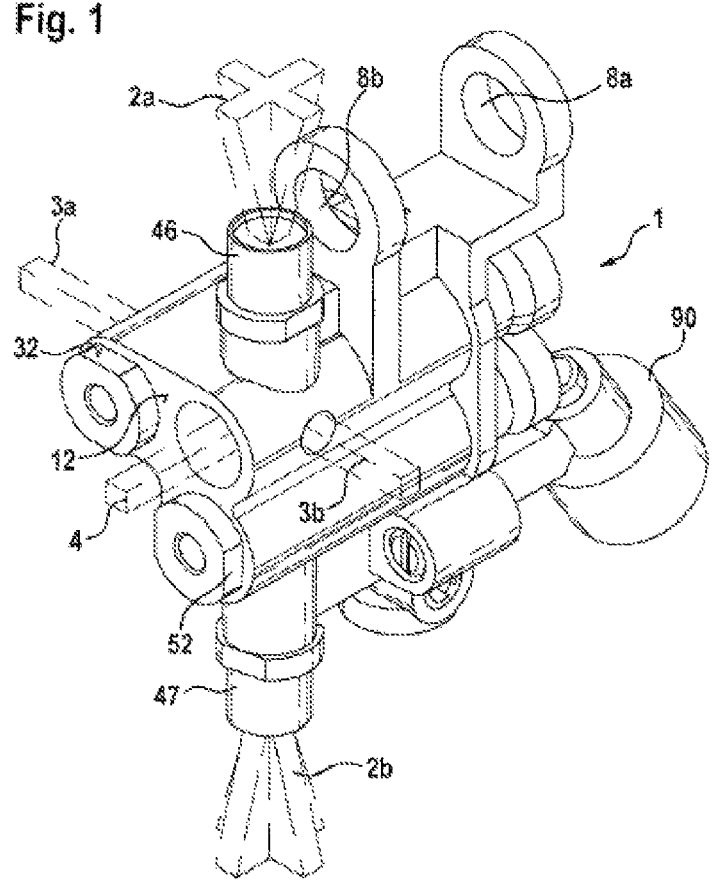
FIG. 1 shows a three-dimensional view of the five-beam laser device with its carrier element.

The illustration of FIG. 1 shows the self-leveling five-beam laser device (in short: laser device) 1, which is rotatably mounted in a self-leveling fashion in a housing via two horizontal shafts.

Five laser beams are generated by the laser device 1. These are the lower vertical beam 2b, which is aimed at the floor of the room, the upper vertical beam 2a, which is aimed at the room ceiling. The two horizontal beams 3a and 3b and frontal beam 4 extend in the horizontal. The directions of the horizontal beams 3a and 3b are antiparallel, and there is an angle of 90° between the frontal beam 4 and the horizontal beams 3a and 3b. These vertical beams 2a and 2b are widened in the form of a reference cross according to FIG. 1 using a DOE (=diffractive optical element—to be explained in more detail later). The self-leveling suspension of the optical unit of the laser device 1 ensures that, for example after a possible shock, said horizontal and vertical directions re-establish themselves automatically.

Figure 2:
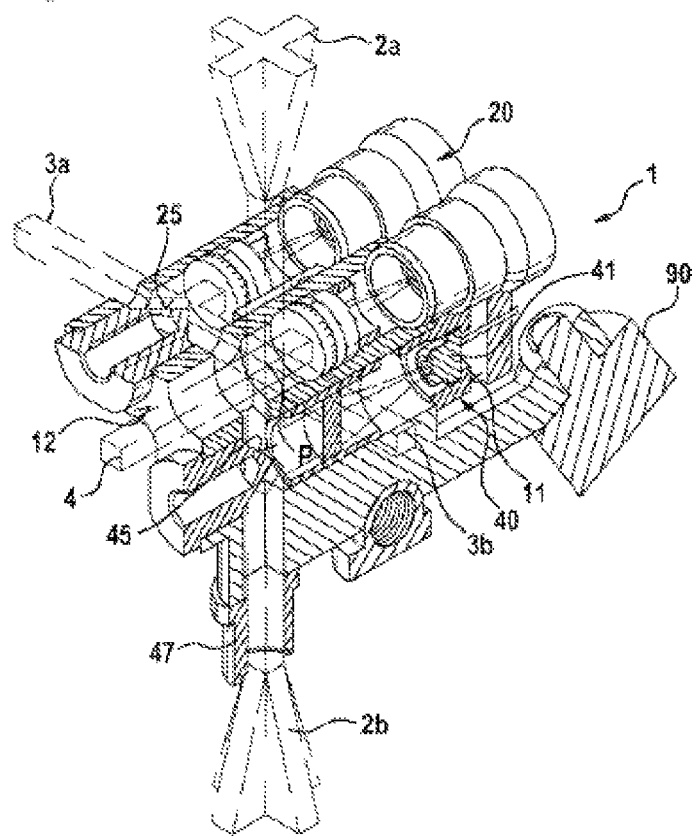
FIG. 2 shows a longitudinal section (vertical section) through the laser device along two of the laser diodes.
Figure 3:
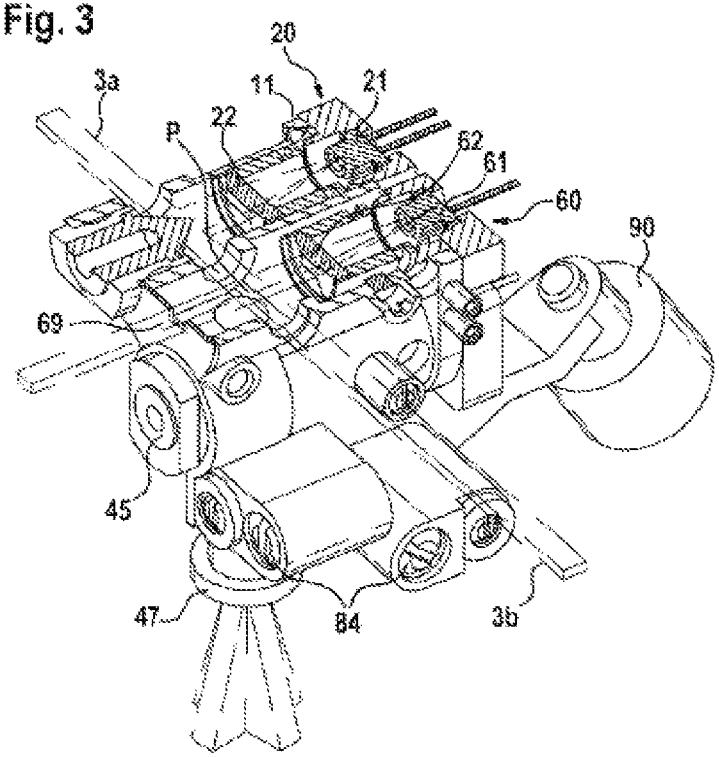
FIG. 3 shows a horizontal section through the laser device along two laser diodes.

When viewing FIGS. 2 and 3 together, the internal construction of the laser device 1 is illustrated. Three laser sources (laser diodes) 21, 41 and 61 are provided. FIG. 3 shows how in each case one laser beam is generated by the laser sources 21 and 61 and widens in the shape of a cone until it reaches the collimating lenses 22 and 62, where it is transformed into a collimated beam, that is to say a parallel beam. Accordingly, a laser beam is generated by the laser source 41 according to FIG. 2.

Inserted into the beam path of the laser source 21 (FIG. 3) is a first roof mirror 25, which splits the beam into two horizontal and antiparallel (that is to say traveling in opposite directions and located on the same axis) beams 3a and 3b. Analogously, a roof mirror 45 is located in the beam path of the laser diode 41, which splits the beam into two vertical and antiparallel beams 2a and 2b. The beam from the third laser source 61 leaves the optical unit after it has passed through the collimating lens 62 and rectangular diaphragm 69.

The laser sources 21 and 61 are situated according to FIG. 3 in the same horizontal plane and the laser source 41 is situated directly underneath the laser source 61. The roof mirrors 25 and 45 are arranged such that in each case one of the generated partial beams meets the beam of the third laser source 61 in a point P. This point P is considered to be the origin of a three-dimensional Cartesian coordinate system which is defined by the laser beams. This intersection point P is located in free air and not for example inside an optical element. These five laser beams, that is to say the split beams from laser diodes 21 and 41 and the beam from laser diode 61, are aimed such that they mark the projection of the axes of the coordinate system for example on the walls of a room in which the laser device is located. This projection can be effected by way of a sharply contoured laser point, as in the beams 3a, 3b and 4 or by way of a laser beam which is fanned out as a coordinate cross, as in the beams 2a and 2b.

As has already been described, the laser diodes 21, 41 and 61 are located in direct proximity with respect to one another and are provided with in each case one adapter which surrounds the relevant laser diode in the manner of a ring and in which the laser diode is attached, preferably adhesively bonded. This adapter forms together with the corresponding laser diode in each case one laser unit 20, 40 and 60, on which a front end is formed which is in contact with a laser-side contact surface 11 of the optical unit.

It is an essential requirement for accurate projection/measurement results that the laser beams are situated with as high a degree of accuracy as possible in said coordinate system. For this purpose, exact positioning and angular positions of the laser diodes 21, 41 and 61 and roof mirrors 25 and 45 are of crucial importance. This is achieved firstly by the three laser units 20, 40 and 60 bearing against the continuous and common laser-side contact surface 11. It is possible in a simple and cost-effect manner in terms of production to produce a continuous, level surface such that exact angular alignment of the lasers with respect to one another is realized by way of them being jointly placed on this surface.

Furthermore, a mirror-side front end 12, which is parallel to the laser-side contact surface 11, is molded onto the optical unit, which front end merges into a cylindrical cutout (hole) in the case of each of roof mirrors 25 and 45. By way of this mirror-side end face 12 and said cylindrical regions, the roof mirrors 25 and 45 are defined in their locational positions to the extent that they merely still need to be aligned along their rotational axes. For this purpose, adjustment surfaces 32 and 52 are molded laterally on the roof mirrors 25, 45, which adjustment surfaces 32 and 52 serve as contact surface for adjusting the angular position of the roof mirrors 25, 45 along their rotational axes. After the roof mirror units have been adjusted in the production process of the optical unit, they are fixed in position either by adhesive bonding or using clamping bolts.

In this sense, the adjustment of the laser beams in the optical unit is very simple because during mounting the laser diodes need only be aligned roughly according to their oval beam widening (will be explained below) and said angle adjustment of the roof mirror should be effected. The construction form of the optical unit ensures that the angular and locational positions of the laser units 20, 40 and 60 with respect to one another and to the roof mirrors 25 and 45 is specified exactly. Since the optical unit is made of a metal material, such as for example aluminum pressure die-casting alloy or zinc pressure die-casting alloy, problems with temperature expansion or ageing, such as deformation, are negligible.

The laser device is enclosed on all sides by a housing (not shown), which is provided at the laser exit regions with windows and protects the laser device against environmental influences such as for example dirt or foreign bodies. Furthermore, the electrical unit is not shown, which is attached to the housing of the laser device and comprises an electrical supply, such as for example batteries, a few switches for switching on and off the individual laser sources, and wiring. The wiring comprises cables which are guided from the electrical unit to the internal optical unit, wherein these cables are configured to be as flexurally slack as possible, so as not to influence if at all possible the self-leveling.

According to FIG. 3, the beam from the third laser source 61 is guided via the collimating lens 62 and, when leaving the optical unit, is masked using the rectangular diaphragm 69. The rectangular diaphragm 69 has an opening with a rectangular shape, which is smaller than the laser beam such that the exiting laser beam obtains a rectangular cross section. Owing to the diffraction at the rectangular diaphragm 69, an interference figure with sidelobes of the projected laser point is produced. On account of this, and on account of the fact that the rectangular diaphragm 69 is aligned in its angular position with respect to the laser beams 2a, 2b, 3a and 3b, a projected cross can be produced on, for example, a building wall from the sidelobes, which projected cross corresponds to the coordinate system of the laser beams. Instead of a rectangular diaphragm 69, it is likewise possible to use a square diaphragm.

The bearing holders 8a and 8b shown in FIG. 1 of the optical unit hold ball bearings and a first bearing shaft (not shown), which rotatably mounts the optical unit in a first angular position. This first bearing shaft is configured as part of a universal joint. The universal joint has a second bearing shaft (not shown), rotated by 90°, which is mounted in the housing using a ball bearing means. The center of gravity of the optical unit is situated perpendicular below the center of the universal joint, with the result that the optical unit can swing to a standstill about two independent directions such that the lasers 3a, 3b and 4 are located in the horizontal.

In order that the optical unit swings to a standstill as quickly as possible, a damping in the form of an eddy-current brake is provided. To this end, an eddy-current block 90 is attached to the optical unit, which eddy-current block 90 is preferably made of copper. The eddy-current block 90 has assigned to it, in direct adjacency and in a contactless manner, a permanent magnet which is attached to the housing. This permanent magnet comprises a plurality of individual magnets which are aligned such that a multiplicity of magnetic field lines are passed through the eddy-current block 90. According to the principle of the Waltenhofen pendulum, relative movement of eddy-current block 90 relative to the permanent magnet induces currents in the eddy-current block 90, the magnetic fields of which act counter to the field(s) of the permanent magnet and thus brake a pendulum movement. The axis of the eddy-current block 90 is tilted by about 30° with respect to the vertical. While for optimum damping effect an alignment of the eddy-current block in the vertical (that is to say 0°) would be optimum, this alignment comes about firstly because the eddy-current block 90 must not cover the region of the lower vertical laser beam 2b and secondly because its weight serves for taring of the optical unit 5.

Furthermore, two taring screws 84 which are offset by 90° are shown in FIG. 3, which taring screws are configured as setscrews. On account of their screw depth into the optical unit, that is to say their perpendicular distance from the first and second bearing shafts, the center of gravity of the optical unit can be adjusted such that it is located perpendicularly underneath the center of the bearing cross of the first and second bearing shaft.

Provided in the beam path of the vertical beams 2a and 2b are DOEs (diffractive optical element) 46, 47, which widen the beams in the form of a coordinate cross. DOEs are diffractive optical elements, in which micropatterns are formed on a glass carrier, for example using photolithography. Similar as in the case of a lens, different optical path lengths of the partial beams lead to phase modulations which produce interference patterns. It is possible thereby to project, using the laser beam, also any desired pattern or figures in addition to coordinate crosses. The DOEs 46, 47 can be arranged not only for the laser beams 2a and 2b, but also for the other beams of the five-beam laser device. Likewise, said rectangular diaphragm 69 can be arranged at a beam other than the frontal beam 4. The number of DOEs 46, 47 or of rectangular diaphragms 69 can be selected freely.

Figure 4:
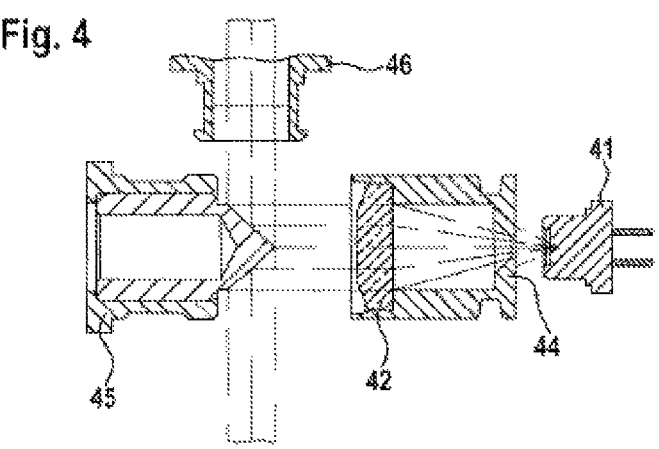
FIG. 4 shows a section through a laser diode with beam path along a roof mirror.

FIG. 4 shows a schematic of the beam splitting using roof mirror 45 and the DOE 46. After the beam has passed the collimating lens 42 and been collimated here, it strikes the roof mirror 45, which is aligned centrally with respect to the beam and has two mirror surfaces aligned at 45° with respect to the beam, which mirror surfaces splits the beam into two partial beams of practically the same intensity and deflects them by in each case about 90° such that two antiparallel partial beams, that is to say two partial beams that travel in opposite directions on the same axis, are formed. Furthermore, FIG. 4 shows a circular diaphragm 44, which is inserted in the beam path between the laser diode 41 and the collimating lens 42 and delimits the elliptic divergent beam produced by the laser diode 41 into a conical beam. The circular diaphragm 44 is, together with the collimating lens 42, configured as a common assembly which is unipartite and is mountable as such in one work step in the optical element. The edge of the roof mirror 45, where the two mirror surfaces meet, is as sharp-edged as possible, that is to say formed with as small a radius as possible, in order to keep scattering losses as low as possible.

Figure 5:
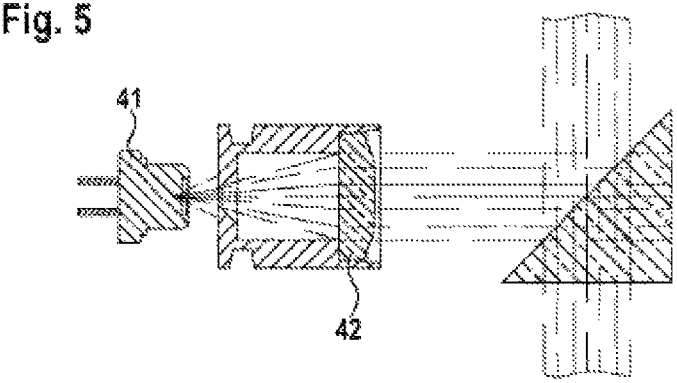
FIG. 5 shows a further embodiment of the beam splitting using a prism.

Alternatively, as shown in FIG. 5, a prism can be used for splitting the beam, in which the beam of the laser element 41 strikes a hypotenuse side of the prism that is configured as a partial mirror, and is partially upwardly deflected there (according to FIG. 5) and partially transmitted into the prism. This beam, which has been transmitted into the prism, is reflected normally at the right-hand front side of the prism and deflected via further reflection in the prism at the hypotenuse side by 90° and thus exits the prism downwardly. The laser beam can be split and deflected into two antiparallel beams on the same axis in this manner, too.

Figure 6:
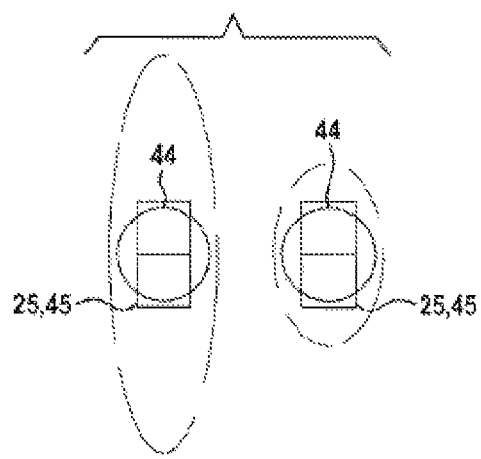
FIG. 6 shows a schematic of the masking of the laser beams and FIG. 7 shows alternative embodiments.

FIG. 6 shows a schematic on the left-hand side of the oval of the laser beam, in the way it is generated by a laser diode of low power. Laser beams generated by laser diodes have on account of technical requirements an oval beam cross section, which is increasingly oval with decreasing laser power. Shown on the right-hand side is the oval of the laser beam from a laser diode of higher power. Consequently, this right-hand beam is thus less oval, that is to say closer to forming a circular shape, than the left-hand beam. On both sides, the circular diaphragm 44 is shown as a circle. FIG. 6 shows that the beams from the lasers are delimited by the circular diaphragm 44 and only part of them strike the roof mirrors 25 or 45, which are shown in plan view as a rectangle. The diameter of the circular diaphragm is selected such that the beam intensity at its inner rim is about 10-15% of the energy of the beam center, such that beam components with a lower energy are masked out/blocked.

Figure 7A:
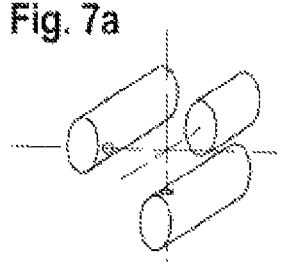
Figure 7B:
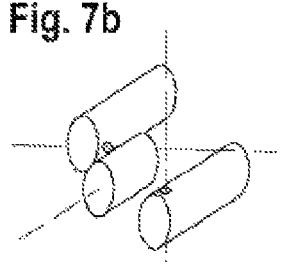

FIG. 7 shows a schematic of two further embodiments. While FIG. 7a corresponds to the principle of the already described main embodiment, FIG. 7b shows an embodiment, in which the laser source which emits the beam that is not split is axially offset such that its beam no longer intersects the two other beams. The axis of the laser beam still passes through the intersection point, however.

Figure 7C:
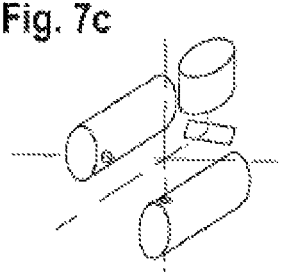

In the alternative of FIG. 7c, the laser source, whose beam is not split, is rotated by 90°, and an additional mirror deflects the beam by the same angle, with the result that once again the already described intersection point is obtained. Any other rotational angles are also feasible.

The disclosure is not restricted by concrete embodiments and features of various embodiments are freely combinable.

The invention claimed is:

1. A self-leveling five-beam laser device, comprising three laser sources, wherein two of the laser beams generated by the laser sources are split into two partial beams each, wherein in each case one of the partial beams intersects the axis of the beam from the third laser source in a point.

2. The five-beam laser device with three laser sources as claimed in claim 1, wherein the beams are split into two axis-identical and antiparallel partial beams, and this splitting is effected by way of roof mirrors.

3. The five-beam laser device as claimed in claim 1, wherein the three laser sources are arranged in an axis-parallel fashion.

4. The five-beam laser device as claimed in claim 3, wherein the three generated laser beams travel in the same direction.

5. The five-beam laser device as claimed in claim 1, wherein the laser sources are configured to be switched on and off separately and/or together.

6. The five-beam laser device as claimed in claim 5, further comprising electrical switching elements configured to switch the laser sources on and off separately and/or together.

7. The five-beam laser device as claimed in claim 1, wherein at least one of the five laser beams or partial beams is passed through a diffractive optical element.

8. The five-beam laser device as claimed in claim 1, wherein at least one of the laser beams or the partial beams is passed through a square or rectangular diaphragm.

9. The five-beam laser device as claimed in claim 1, wherein at least one of the laser beams to be split is passed through a circular diaphragm for circular masking.

10. The five-beam laser device as claimed in claim 9, further comprising a collimating lens, wherein the laser sources are configured as laser diodes and said collimating lens is provided in each case in the beam path and the at least one diaphragm for circular masking is arranged between the laser diode and the collimating lens.

11. The five-beam laser device as claimed in claim 9, wherein the diaphragm for circular masking is combined with a collimating lens to form an assembly.

12. The five-beam laser device as claimed in claim 1, wherein the five-beam laser device has an internal optical unit as a holder for the laser source, and the internal optical unit is mounted against a housing of the five-beam laser device in a self-leveling manner along two mutually perpendicular and horizontal bearing shafts.

13. The five-beam laser device as claimed in claim 1, wherein the internal optical unit is coupled with respect to the external housing via a vibration damping mechanism and the vibration damping mechanism is configured as an eddy-current brake.

14. The five-beam laser device as claimed in claim 13, wherein the vibration damping mechanism is configured as an eddy-current brake.

* * * * *